United States Patent
Bae

(10) Patent No.: US 11,011,932 B2
(45) Date of Patent: May 18, 2021

(54) MOUSE PAD COMPRISING WIRELESS POWER TRANSMISSION APPARATUS AND MOUSE

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 308 days.

(21) Appl. No.: 16/077,845

(22) PCT Filed: Feb. 2, 2017

(86) PCT No.: PCT/KR2017/001111
§ 371 (c)(1),
(2) Date: Aug. 14, 2018

(87) PCT Pub. No.: WO2017/142235
PCT Pub. Date: Aug. 24, 2017

(65) Prior Publication Data
US 2020/0076233 A1     Mar. 5, 2020

(30) Foreign Application Priority Data
Feb. 15, 2016    (KR) ........................ 10-2016-0017052

(51) Int. Cl.
*H02J 50/12*      (2016.01)
*H02J 50/80*      (2016.01)
(Continued)

(52) U.S. Cl.
CPC ............ *H02J 50/12* (2016.02); *G06F 1/3259* (2013.01); *G06F 3/039* (2013.01); *G06F 3/0395* (2013.01);
(Continued)

(58) Field of Classification Search
CPC .. H02J 50/12; H02J 50/80; H02J 50/90; H02J 50/10; G06F 1/3259; G06F 3/03543; G06F 3/0395; G06F 3/039
(Continued)

(56) References Cited

U.S. PATENT DOCUMENTS

2005/0235159 A1* 10/2005 Anandakumar .... G06F 3/03543
                                               713/185
2007/0097078 A1* 5/2007 Chin ................... G06F 3/03543
                                               345/166
(Continued)

FOREIGN PATENT DOCUMENTS

EP        2 410 632 A1     1/2012
JP        2009271846 A   * 11/2009  ......... H02J 7/00308
(Continued)

OTHER PUBLICATIONS

Thoen et al., "Development of a Communication Scheme for Wireless Power Applications With Moving Receivers," IEEE Transactions on Microwave Theory and Techniques, Mar. 2015, vol. 63, No. 3, pp. 857-863.

*Primary Examiner* — Richard Isla
*Assistant Examiner* — Manuel Hernandez
(74) *Attorney, Agent, or Firm* — Birch, Stewart, Kolasch & Birch, LLP

(57) ABSTRACT

A mouse pad includes a wireless power transmission apparatus including at least a first transmission coil and a second transmission coil and configured to wirelessly transmit power to a mouse placed on the mouse pad; and a controller configured to directly receive determination information for selecting one transmission coil among the first transmission coil and the second transmission coil according to a movement of the mouse on the mouse pad from a power supply connected to the mouse pad, and enable the second transmission coil and disable the first transmission coil when the movement of the mouse indicates the mouse is moving on the mouse pad from the first transmission coil to the second transmission coil.

16 Claims, 11 Drawing Sheets

(51) Int. Cl.
*G06F 3/039* (2013.01)
*H02J 50/10* (2016.01)
*G06F 1/3234* (2019.01)
*G06F 3/0354* (2013.01)

(52) U.S. Cl.
CPC .......... *G06F 3/03543* (2013.01); *H02J 50/10* (2016.02); *H02J 50/80* (2016.02)

(58) Field of Classification Search
USPC .......................................... 320/108; 307/104
See application file for complete search history.

(56) References Cited

U.S. PATENT DOCUMENTS

| | | | | |
|---|---|---|---|---|
| 2011/0316349 A1* | 12/2011 | Hashiguchi | ............. | H02J 5/005 307/104 |
| 2015/0078461 A1 | 3/2015 | Lee et al. | | |
| 2015/0236513 A1* | 8/2015 | Covic | .................... | H02J 7/025 307/104 |
| 2015/0241999 A1 | 8/2015 | Bae | | |
| 2016/0028266 A1* | 1/2016 | Madau | .................... | H02J 50/10 320/108 |
| 2016/0085322 A1* | 3/2016 | Park | ....................... | G06F 1/266 345/163 |
| 2016/0098100 A1* | 4/2016 | Chang | .................. | G06F 3/0317 345/166 |
| 2018/0224888 A1* | 8/2018 | Gurunathan | ............ | H02J 50/10 |
| 2019/0393711 A1* | 12/2019 | Chou | .................... | H02J 7/0029 |

FOREIGN PATENT DOCUMENTS

| | | |
|---|---|---|
| KR | 2000-0066532 A | 11/2000 |
| KR | 20000066532 A * | 11/2000 |
| KR | 10-2008-0096917 A | 11/2008 |
| KR | 10-1465750 B1 | 12/2014 |
| WO | WO 2013/012114 A1 | 1/2013 |

* cited by examiner

MOUSE PAD COMPRISING WIRELESS POWER TRANSMISSION APPARATUS AND MOUSE

CROSS REFERENCE TO RELATED APPLICATIONS

This application is the National Phase of PCT International Application No. PCT/KR2017/001111, filed on Feb. 2, 2017, which claims priority under 35 U.S.C. 119(a) to Patent Application No. 10-2016-0017052, filed in the Republic of Korea on Feb. 15, 2016, all of which are hereby expressly incorporated by reference into the present application.

TECHNICAL FIELD

The present invention relates to wireless power transmission technology, and more particularly to a mouse pad including a wireless power transmission apparatus and a mouse.

BACKGROUND ART

Recently, with the rapid development of information and communication technology, a ubiquitous society is arising based on information and communication technology.

In order for information and communication devices to be connected anytime and anywhere, sensors equipped with a computer chip having a communication function need to be installed in all facilities in society. Therefore, the problem of supplying power to these devices and sensors is a new challenge. In addition, as a variety of portable devices, such as music players, including Bluetooth headsets and iPods, as well as mobile phones, has been rapidly increasing, charging batteries has come to require greater time and effort on the part of users. As a way to solve this problem, a wireless power transmission technology has recently attracted attention.

Wireless power transmission (wireless energy transfer) technology is a technology for wirelessly transmitting electrical energy from a transmitter to a receiver using an electromagnetic induction principle. An electric motor or a transformer that uses such an electromagnetic induction principle was already in use in the 1800s, and thereafter, a method of transferring electrical energy by radiating electromagnetic waves, such as radio waves, a laser, high-frequency waves, and microwaves, has also been attempted. Electric toothbrushes and some wireless shavers that are often used are also actually charged with the electromagnetic induction principle.

Wireless energy transfer schemes devised to date may be broadly classified into an electromagnetic induction scheme, an electromagnetic resonance scheme, and an RF transmission scheme using a short wavelength radio frequency.

Meanwhile, a mouse, which is one of input devices used in a graphic environment of a computer, is mainly used by being directly connected to a main body of the computer, but research on a wireless mouse that performs wireless communication with the computer rather than being directly connected thereto for user convenience is actively being conducted.

Unlike a mouse that is directly connected to the main body of the computer, such a wireless mouse generally requires a separate power source and includes a battery that is removably provided.

Therefore, a user who uses the wireless mouse must suffer the inconvenience of frequently replacing the battery that supplies power to the mouse.

Technical Object

It is an object of the present invention to provide a mouse pad and a mouse that overcome the inconvenience of periodically replacing a battery through the wireless supply of power to a wireless mouse.

Technical Solution

To achieve the above-described object, the present invention provides a mouse including a body, a controller, a motion sensor unit provided inside the body to obtain motion information generated according to movement of the body, at least one communication unit, and a wireless power reception apparatus configured to wirelessly receive power.

The wireless power reception apparatus may receive the power in a self-resonance scheme.

The at least one communication unit may include a first communication unit configured to perform wireless communication in a first scheme, and a second communication unit configured to perform wireless communication in a second scheme.

The motion information may include first motion information and second motion information, the motion sensor unit may be provided so as to transmit the first motion information and the second motion information to the controller, and the controller may transmit the first motion information to the first communication unit and transmit the second motion information to the second communication unit.

The first motion information transmitted to the first communication unit may be input to a user's PC, and the second motion information transmitted to the second communication unit may be transmitted to a wireless power transmission apparatus including a plurality of transmission coils so that state transition of the plurality of transmission coils is controlled.

The motion information may be transmitted to the controller, and the controller, which has received the motion information, may transmit the motion information to a user's PC through the communication unit.

The motion information may be transmitted from the user's PC to a wireless power transmission apparatus including a plurality of transmission coils so that state transition of the plurality of transmission coils is controlled.

The present invention provides a mouse pad including a body configured to accommodate a mouse therein, a controller, at least one communication unit configured to receive motion information generated according to movement of the mouse, and a wireless power transmission apparatus including a plurality of transmission coils and configured to wirelessly transmit power.

The communication unit may include a first communication unit provided to perform communication in a first scheme, and a second communication unit provided to perform communication in a second scheme.

The motion information may include first motion information and second motion information, and the first motion information may be transmitted to a user's PC through the first communication unit, and the second motion information may be transmitted to the controller through the second communication unit.

The second motion information transmitted to the controller may generate state change information for controlling state transition of the plurality of transmission coils.

The wireless power transmission apparatus may further include a coil selector configured to selectively transition the plurality of coils to an enabled state or a disabled state, and the state change information may be transmitted to the coil selector.

The motion information may be transmitted to the controller, and the controller, which has received the motion information, may generate state change information for controlling state transition of the plurality of transmission coils.

The controller may be provided so as to communicate directly with a user's PC.

The motion information may be transmitted to the communication unit, the communication unit may transmit the received motion information to a user's PC, and the user's PC may generate state change information for controlling state transition of the plurality of transmission coils using the motion information.

The wireless power transmission apparatus may further include a coil selector configured to selectively transition the plurality of coils to an enabled state or a disabled state, and the state change information may be transmitted to the coil selector.

The present invention provides a mouse and a mouse pad including the mouse including a wireless power reception apparatus and the mouse pad including a wireless power transmission apparatus providing a space for accommodating the mouse therein and including a plurality of transmission coils, wherein the mouse includes a motion sensor unit configured to collect motion information generated according to movement of the mouse, and wherein the motion information is transmitted to the wireless power transmission apparatus of the mouse pad to control state transition of the plurality of coils.

The mouse pad may include a first controller and at least one first communication unit configured to receive the motion information generated according to the movement of the mouse, and the mouse may include a body, a second controller, the motion sensor unit provided inside the body to obtain motion information generated according to movement of the body, and at least one second communication unit.

The first communication unit may include a first-first communication unit configured to perform wireless communication in a first scheme and a first-second communication unit configured to perform wireless communication in a second scheme, the second communication unit may include a second-first communication unit configured to perform wireless communication in a first scheme and a second-second communication unit configured to perform wireless communication in a second scheme, the motion information collected by the motion sensor unit may include first motion information and second motion information, the first motion information may be transmitted to a user's PC through the second-first communication unit and the first-first communication unit, and the second motion information may be transmitted to the first controller through the second-second communication unit and the first-second communication unit.

The motion information may be transmitted to a user's PC, the user's PC generates state change information for controlling state transition of the plurality of transmission coils using the motion information, and the state change information may be transmitted to the wireless power transmission apparatus of the mouse pad to control state transition of the plurality of transmission coils.

Advantageous Effects

The present invention may provide a mouse pad and a mouse that overcome the inconvenience of periodically replacing a battery through the wireless supply of power to the mouse by providing a wireless power transmitter in the mouse pad and a wireless power receiver in the mouse.

DESCRIPTION OF DRAWINGS

The accompanying drawings are included to provide a further understanding of the invention, and illustrate the embodiments of the present invention together with the following detailed description. It is to be understood, however, that the technical features of the present invention are not limited to the specific drawings, and the features disclosed in the respective drawings may be combined with each other to constitute a new embodiment.

BEST MODE

Figure 1:
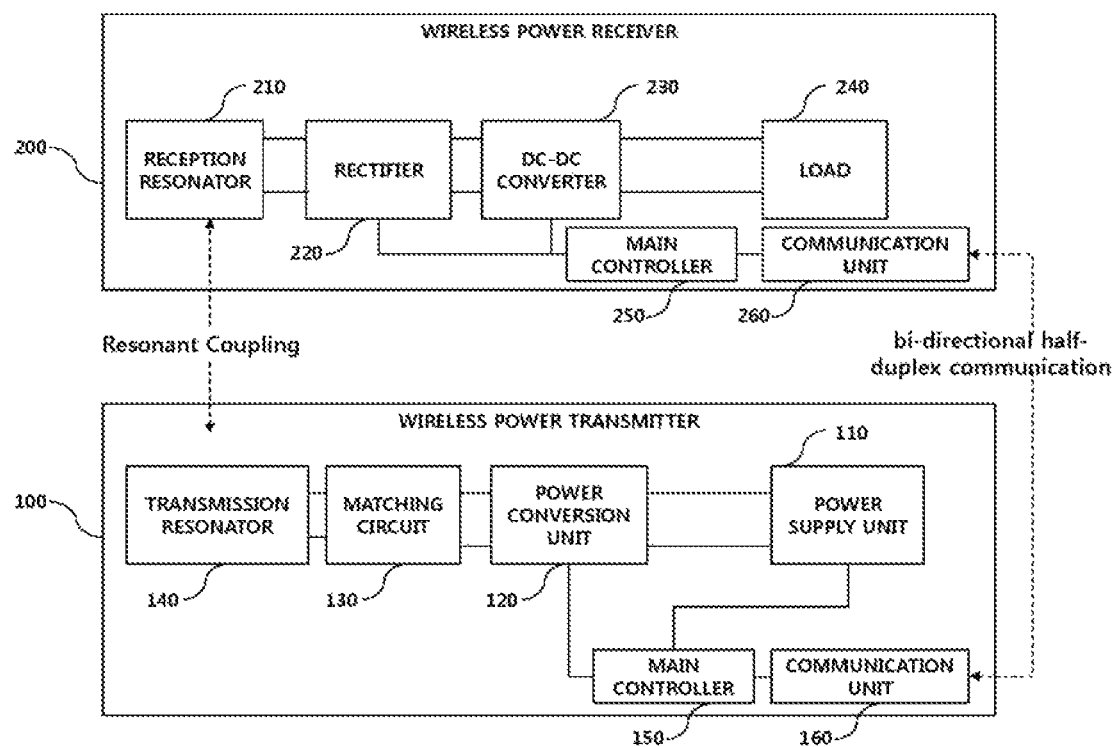
FIG. 1 is a block diagram for explaining the structure of a wireless power transmission system according to an embodiment of the present invention.

According to an embodiment of the present invention, a mouse may include a body, a controller, a motion sensor unit provided inside the body to obtain motion information generated according to movement of the body, at least one communication unit, and a wireless power reception apparatus configured to wirelessly receive power.

Mode for Invention

Hereinafter, devices and various methods, to which the embodiments of the present invention are applied, will be described in more detail with reference to the accompanying drawings. With respect to constituent elements used in the following description, suffixes "module" and "unit" are given or mingled with each other only in consideration of ease in the preparation of the specification, and do not have or serve as different meanings.

While all constituent elements of the embodiments of the present invention have been described as being coupled to each other into one or as being operated in connection with each other, the present invention is not limited to these embodiments. That is, one or more of all of the elements may be selectively coupled and operated without exceeding the scope of the present invention. In addition, each of all constituent elements may be realized as independent hardware, but some or all of the constituent elements may be selectively combined and realized as computer program having a program module, which performs some or all of functions combined in one piece or a plural pieces of hardware. Codes and code segments constituting the computer program may be easily derived by those skilled in the art. The computer program may stored in a computer readable storage medium so as be read and executed by a computer, thereby realizing the embodiments of the present invention. Examples of the storage medium of the computer program may include a magnet recording medium, an optical recording medium, and a carrier-wave medium.

In addition, the terms "includes" "constitutes" and/or "has", when used in this specification, specify the presence of stated elements, but do not preclude the presence or addition of other elements. Unless otherwise defined, all terms (including technical and scientific terms) used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

In addition, in the description of constituent elements of the present invention, the terms "first", "second", "A", "B", "(a)", "(b)", and the like will be used. These terms are used for distinguishing between similar elements and not necessarily for describing a particular sequential or chronological order. It will be understood that when any element is referred to as being "connected to," "coupled to", or "joined to" another element, it may be directly on, connected to or coupled to the other element or intervening elements may be present.

FIG. 1 is a block diagram for explaining the structure of a wireless power transmission system according to an embodiment of the present invention.

Referring to FIG. 1, the wireless power transmission system may include a wireless power transmitter 100 and a wireless power receiver 200.

Although FIG. 1 illustrates that the wireless power transmitter 100 transmits wireless power to one wireless power receiver 200, this is only one embodiment, and the wireless power transmitter 100 according to another embodiment of the present invention may transmit wireless power to a plurality of wireless power receivers 200. It is to be noted that the wireless power receiver 200 according to a further embodiment may receive wireless power from a plurality of wireless power transmitters 100 at the same time.

The wireless power transmitter 100 may generate a magnetic field using a specific power transmission frequency to transmit power to the wireless power receiver 200.

The wireless power receiver 200 may receive power by tuning to the same frequency as that used by the wireless power transmitter 100.

For example, the frequency for power transmission may be 6.78 MHz, without being limited thereto.

That is, the power transmitted by the wireless power transmitter 100 may be transferred to the wireless power receiver 200, which is resonantly coupled with the wireless power transmitter 100.

The maximum number of wireless power receivers 200 that may receive power from one wireless power transmitter 100 may be determined by the maximum power transmission level of the wireless power transmitter 100, the maximum power reception level of the wireless power receiver 200, and the physical structure of the wireless power transmitter 100 and the wireless power receiver 200.

The wireless power transmitter 100 and the wireless power receiver 200 may perform bidirectional communication in a frequency band different from the frequency band for wireless power transmission, i.e., the resonance frequency band. For example, bi-directional communication may use a half-duplex Bluetooth Low Energy (BLE) communication protocol.

The wireless power transmitter 100 and the wireless power receiver 200 may mutually exchange characteristic and state information, i.e., power negotiation information, via the bidirectional communication.

For example, the wireless power receiver 200 may transmit certain power reception state information for controlling the level of power received from the wireless power transmitter 100 to the wireless power transmitter 100 via bidirectional communication, and the wireless power transmitter 100 may dynamically control the transmission power level based on the received power reception state information. Thereby, the wireless power transmitter 100 may not only optimize power transmission efficiency but may also provide a function of preventing a load breakage due to overvoltage or a function of preventing unnecessary power consumption due to undervoltage, for example.

In addition, the wireless power transmitter 100 may perform, for example, a function of authenticating and identifying the wireless power receiver 200, a function of identifying incompatible devices or non-rechargeable objects, or a function of identifying a valid load via bidirectional communication.

Hereinafter, a resonance type wireless power transmission process will be described in more detail with reference to FIG. 1.

The wireless power transmitter 100 may include a power supply unit 110, a power conversion unit 120, a matching circuit 130, a transmission resonator 140, a main controller 150, and a communication unit 160. The communication unit may include a data transmitter and a data receiver.

The power supply unit 110 may supply a specific supply voltage to the power conversion unit 120 under the control of the main controller 150. Here, the supply voltage may be a DC voltage or an AC voltage.

The power conversion unit 120 may convert the voltage received from the power supply unit 110 into a specific voltage under the control of the main controller 150. To this end, the power conversion unit 210 may include at least one of a DC/DC converter, an AC/DC converter, or a power amplifier.

The matching circuit 130 is a circuit that matches impedances between the power conversion unit 210 and the transmission resonator 140 in order to maximize power transmission efficiency.

The transmission resonator 140 may wirelessly transmit power using a specific resonance frequency according to the voltage applied from the matching circuit 130.

The wireless power receiver 100 may include a reception resonator 210, a rectifier 220, a DC-DC converter 230, a load 240, a main controller 250, and a communication unit 260. The communication unit may include a data transmitter and a data receiver.

The reception resonator 210 may receive the power transmitted by the transmission resonator 140 through a resonance phenomenon.

The rectifier 210 may perform a function of converting an AC voltage applied from the reception resonator 210 into a DC voltage.

The DC-DC converter 230 may convert the rectified DC voltage into a specific DC voltage required by the load 240.

The main controller 250 may control the operation of the rectifier 220 and the DC-DC converter 230, or may generate the characteristic and state information of the wireless power receiver 200 and control the communication unit 260 to transmit the characteristic and state information of the wireless power receiver 200 to the wireless power transmitter 100. For example, the main controller 250 may control the operation of the rectifier 220 and the DC-DC converter 230 by monitoring the strength of the voltage and current output from the rectifier 220 and the DC-DC converter 230.

The monitored output voltage and current strength information may be transmitted to the wireless power transmitter 100 via the communication unit 260 in real time.

In addition, the main controller 250 may compare the rectified DC voltage with a predetermined reference voltage to determine whether the voltage is in an overvoltage state or in an undervoltage state, and when a system error state is detected according to the determination result, may transmit the detection result to the wireless power transmitter 100 via the communication unit 260.

In addition, when a system error state is detected, the main controller 250 may control the operation of the rectifier 220 and the DC-DC converter 230 in order to prevent damage to the load, or may control the power to be applied to the load 240 using a predetermined overcurrent cutoff circuit including a switch and/or a Zener diode.

It is to be noted that the main controllers 150 and 250 and the communication units 160 and 260 are configured as mutually different modules in FIG. 1, but this is only one embodiment, and in another embodiment of the present invention, the main controllers 150 and 250 and the communication units 160 and 260 may be configured as a single module.

Figure 2:
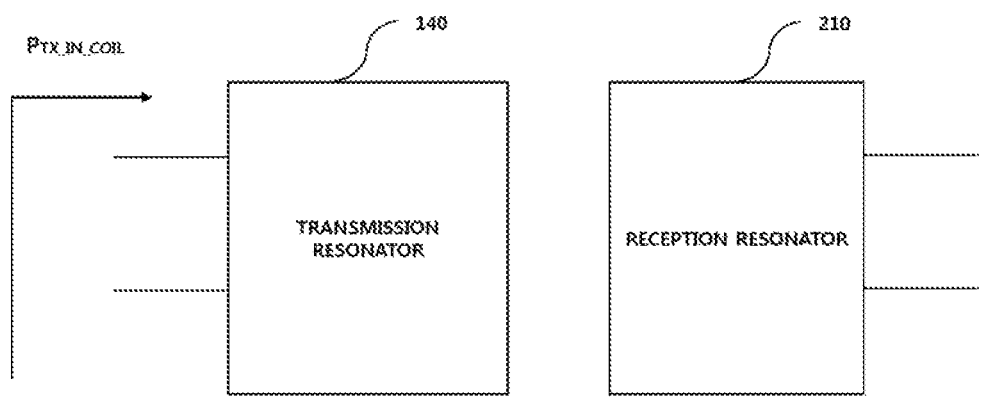
FIG. 2 is a view for explaining the type and characteristics of a wireless power transmitter according to an embodiment of the present invention.

FIG. 2 is a view for explaining the type and characteristics of a wireless power transmitter according to an embodiment of the present invention.

The type and characteristics of each of the wireless power transmitter and the wireless power receiver according to the present invention may be classified into a corresponding class and category.

The type and characteristics of the wireless power transmitter may be largely identified through the following three parameters.

First, the wireless power transmitter may be identified by a class determined according to the strength of the maximum power applied to the transmission resonator 140.

Here, the class of the wireless power transmitter may be determined by comparing the maximum value of power PTX_IN_COIL applied to the transmission resonator 140 with predefined maximum input power PTX_IN_MAX specified in the following wireless power transmitter class table (hereinafter referred to as Table 1). Here, the power PTX_IN_COIL may be an average real number value calculated by dividing the product of a voltage V(t) and current I(t) applied to the transmission resonator 140 during a time by the time.

TABLE 1

| Class | Maximum Input Power | Minimum Category Support Requirement | Maximum Number of Supportable Devices |
| --- | --- | --- | --- |
| Class 1 | 2 W | 1 × Class 1 | 1 × Class 1 |
| Class 2 | 10 W | 1 × Class 3 | 2 × Class 2 |
| Class 3 | 16 W | 1 × Class 4 | 2 × Class 3 |
| Class 4 | 33 W | 1 × Class 5 | 3 × Class 3 |
| Class 5 | 50 W | 1 × Class 6 | 4 × Class 3 |
| Class 6 | 70 W | 1 × Class 6 | 5 × Class 3 |

The classes disclosed in the above Table 1 are only one embodiment, and new classes may be added or deleted. In addition, it is to be noted that values for the maximum input power, the minimum category support requirement, and the maximum number of supportable devices for each class may vary according to the use, shape, and implementation mode of the wireless power transmitter.

For example, referring to Table 1, when the maximum value of the power PTX_IN_COIL applied to the transmission resonator 140 is greater than or equal to the PTX_IN_MAX value corresponding to class 3 and is less than the PTX_IN_MAX value corresponding to class 4, the class of the wireless power transmitter may be determined to be class 3.

Second, the wireless power transmitter may be identified according to the minimum category support requirement corresponding to the identified class.

Here, the minimum category support requirement may be the number of supportable wireless power receivers corresponding to the highest level category among categories of wireless power receivers that the wireless power transmitter of the corresponding class is capable of supporting. That is, the minimum category support requirement may be the minimum number of maximum category devices that the wireless power transmitter is capable of supporting. Here, the wireless power transmitter is capable of supporting all categories of wireless power receivers that are equal to or less than the maximum category depending on the minimum category support requirement.

However, the wireless power transmitter may be capable of supporting a wireless power receiver of a category higher than the category specified in the minimum category support requirement. In other words, the wireless power transmitter may not be limited in its ability to support wireless power receivers.

For example, referring to the above Table 1, a wireless power transmitter of class 3 needs to support at least one category 5 wireless power receiver. Of course, in this case, the wireless power transmitter may support the wireless power receiver 100 that corresponds to a category level lower than the category level corresponding to the minimum category support requirement.

In addition, it is to be noted that the wireless power transmitter may support a wireless power receiver in a higher level category when it is determined that the wireless power transmitter is capable of supporting a higher level category than the category corresponding to the minimum category support requirement.

Third, the wireless power transmitter may be identified by the maximum number of supportable devices corresponding to the identified class. Here, the maximum number of supportable devices may be identified by the maximum number of supportable wireless power receivers corresponding to the lowest level category among categories that may be supported by the identified class (hereinafter simply referred to as the maximum number of supportable devices).

For example, referring to the above Table 1, a wireless power transmitter of class 3 needs to be able to support up to two wireless power receivers of minimum category 3.

However, the wireless power transmitter may be capable of supporting more than the maximum number of devices corresponding to the class thereof. In other words, the wireless power transmitter is not limited so as to be incapable of supporting more than the maximum number of devices.

The wireless power transmitter according to the present invention needs to be able to perform wireless power transmission to at least a number of devices defined in the above Table 1 within available power when there is no particular reason not to allow a power transfer request from a particular wireless power receiver.

In one example, the wireless power transmitter may not accept a power transfer request from a wireless power receiver when there is not enough available power to accommodate the power transfer request. Alternatively, the power adjustment of the wireless power receiver may be controlled.

In another example, the wireless power transmitter may not accept a power transfer request from a wireless power receiver when the number of wireless power receivers that may be accepted is exceeded upon accepting the power transfer request.

In still another example, the wireless power transmitter may not accept a power transfer request from a wireless power receiver when the category of the wireless power receiver that requests power transfer exceeds a category level that may be supported in the class of the wireless power transmitter.

In a further example, the wireless power transmitter may not accept a power transfer request from a wireless power receiver when the internal temperature exceeds a reference value.

Figure 3:
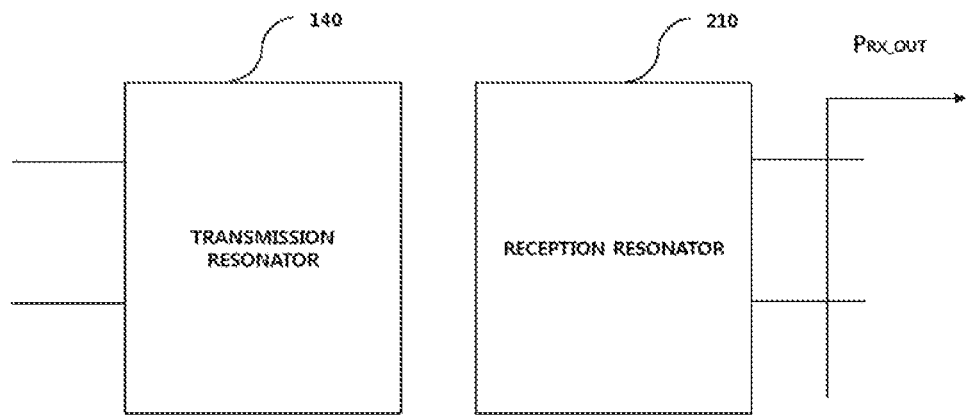
FIG. 3 is a view for explaining the type and characteristics of a wireless power receiver according to an embodiment of the present invention.

FIG. 3 is a view for explaining the type and characteristics of a wireless power receiver according to an embodiment of the present invention.

As illustrated in FIG. 3, the average output voltage PRX_OUT of the reception resonator 210 may be a real number value calculated by dividing the product of a voltage V(t) and current I(t) output by the reception resonator 210 during a time by the time.

The category of the wireless power receiver may be defined based on the maximum output voltage PRX_OUT_MAX of the reception resonator 210, as illustrated in the following Table 2.

TABLE 2

| Category | Maximum Input Power | Application Example |
|---|---|---|
| Category 1 | TBD | Bluetooth headset |
| Category 2 | 3.5 W | Feature Phone |
| Category 3 | 6.5 W | Smart Phone |
| Category 4 | 13 W | Tablet |
| Category 5 | 25 W | Small Laptop Computer |
| Category 6 | 37.5 W | Laptop Computer |
| Category 6 | 50 W | TBD |

For example, when charging efficiency at the load end is 80% or more, the wireless power receiver of category 3 may supply 5 W of power to a charging port of the load.

The categories disclosed in the above Table 2 are only one embodiment, and new categories may be added or deleted. It is also to be noted that the maximum output power and the application example for each category illustrated in the above Table 2 may also vary according to the use, shape, and implementation mode of the wireless power receiver.

Figure 4:
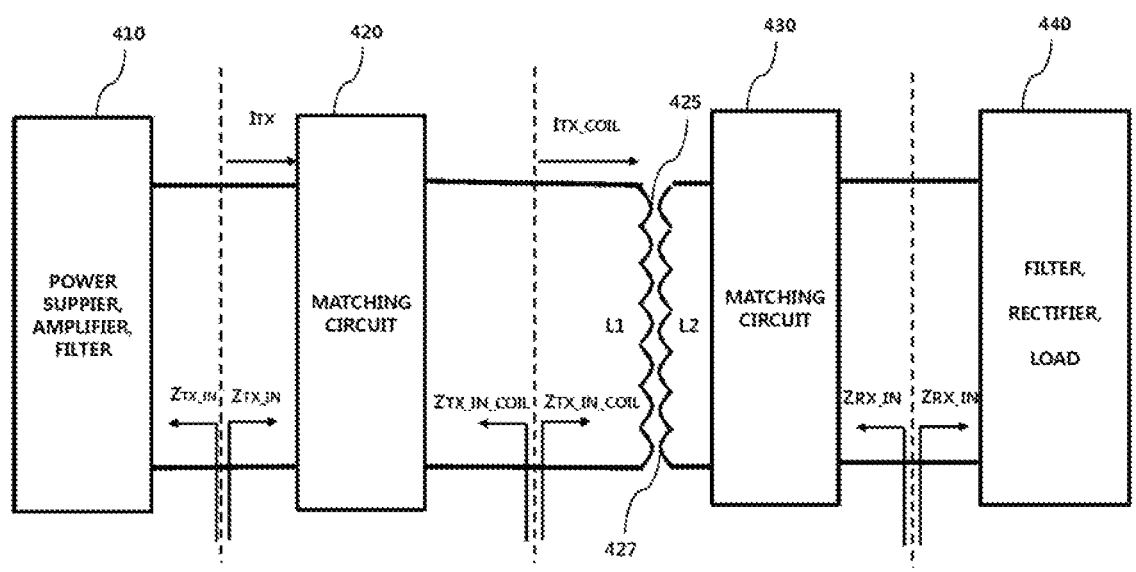
FIG. 4 is an equivalent circuit diagram of the wireless power transmission system according to an embodiment of the present invention.

FIG. 4 is an equivalent circuit diagram of the wireless power transmission system according to an embodiment of the present invention.

Specifically, FIG. 4 illustrates interface points on an equivalent circuit in which reference parameters, which will be described below, are measured.

Hereinafter, the meaning of the reference parameters illustrated in FIG. 4 will be briefly described.

"ITX" and "ITX_COIL" respectively denote the root mean square (RMS) current applied to a matching circuit (or matching network) 420 of the wireless power transmitter and the RMS current applied to a transmission resonator coil 425 of the wireless power transmitter.

"ZTX_IN" denotes the input impedance at the rear end of a power supplier/amplifier/filter 410 of the wireless power transmitter and the input impedance at the front end of the matching circuit 420.

"ZTX_IN_COIL" denotes the input impedance at the rear end of the matching circuit 420 and at the front end of the transmission resonator coil 425.

"L1" and "L2" respectively denote the inductance value of the transmission resonator coil 425 and the inductance value of a reception resonator coil 427.

"ZRX_IN" denotes the input impedance at the rear end of a matching circuit 430 of the wireless power receiver and at the front end of a filter/rectifier/load 440 of the wireless power receiver.

The resonance frequency used for the operation of the wireless power transmission system according to the embodiment of the present invention may be 6.78 MHz±15 kHz.

In addition, the wireless power transmission system according to the embodiment may provide simultaneous charging, i.e., multi-charging, for a plurality of wireless power receivers. In this case, even if new wireless power receivers are added or deleted, variation in the power received by the remaining wireless power receivers may be controlled so as not to exceed a predetermined reference value or more. For example, variation in the received power may be ±10%, without being limited thereto.

As the condition for maintaining the variation in the received power, when a wireless power receiver is added to or deleted from the charging area, the wireless power receiver must not overlap the existing wireless power receiver.

When the matching circuit 430 of the wireless power receiver is connected to a rectifier, a real number part of "ZTX_IN" may be inversely related to the load resistance of the rectifier (hereinafter referred to as RRECT). That is, an increase in RRECT may decrease "ZTX_IN", and a decrease in RRECT may increase "ZTX_IN".

Resonator coupling efficiency according to the present invention may be the maximum power reception rate, calculated by dividing the power transmitted from the reception resonator coil to the load 440 by the power to be loaded in the resonant frequency band by the transmission resonator coil 425. The resonator coupling efficiency between the wireless power transmitter and the wireless power receiver may be calculated when the reference port impedance ZTX_IN of the transmission resonator and the reference port impedance ZRX_IN of the reception resonator are perfectly matched.

The following Table 3 is an example of the minimum resonator coupling efficiency depending on the class of the wireless power transmitter and the class of the wireless power receiver according to an embodiment of the present invention.

TABLE 3

|         | Category 1 | Category 2 | Category 3 | Category 4 | Category 5 | Category 6 | Category 7 |
|---------|------------|------------|------------|------------|------------|------------|------------|
| Class 1 | N/A        | N/A        | N/A        | N/A        | N/A        | N/A        | N/A        |
| Class 2 | N/A        | 74% (−1.3) | 74% (−1.3) | N/A        | N/A        | N/A        | N/A        |
| Class 3 | N/A        | 74% (−1.3) | 74% (−1.3) | 76% (−1.2) | N/A        | N/A        | N/A        |
| Class 4 | N/A        | 50% (−3)   | 65% (−1.9) | 73% (−1.4) | 76% (−1.2) | N/A        | N/A        |
| Class 5 | N/A        | 40% (−4)   | 60% (−2.2) | 63% (−2)   | 73% (−1.4) | 76% (−1.2) | N/A        |
| Class 5 | N/A        | 30% (−5.2) | 50% (−3)   | 54% (−2.7) | 63% (−2)   | 73% (−1.4) | 76% (−1.2) |

When a plurality of wireless power receivers is used, the minimum resonator coupling efficiency corresponding to the classes and categories illustrated in the above Table 3 may increase.

Figure 5:
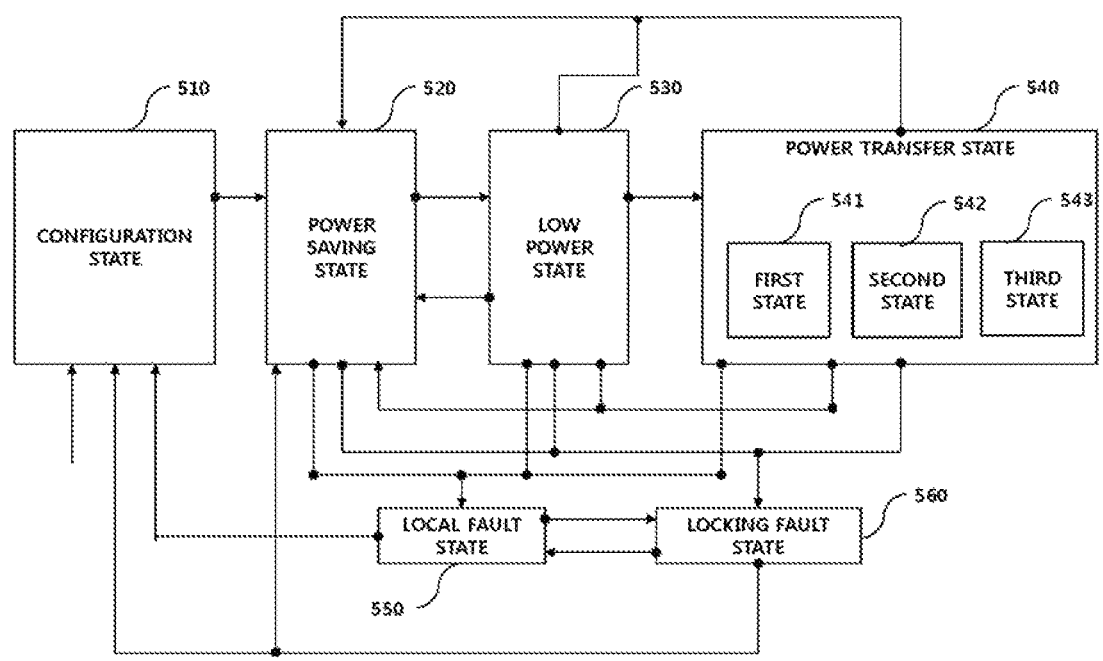
FIG. 5 is a state transition diagram for explaining a state transition procedure in the wireless power transmitter according to an embodiment of the present invention.

FIG. 5 is a state transition diagram for explaining a state transition procedure in the wireless power transmitter according to an embodiment of the present invention.

Referring to FIG. 5, the state of the wireless power transmitter may broadly include a configuration state 510, a power saving state 520, a low power state 530, a power transfer state 540, a local fault state 550, and a locking fault state 560.

When power is applied to the wireless power transmitter, the wireless power transmitter may transition to the configuration state 510. The wireless power transmitter may transition to the power saving state 520 when a predetermined reset timer expires or an initialization procedure is completed in the configuration state 510.

In the power saving state 520, the wireless power transmitter may generate a beacon sequence and transmit the beacon sequence through a resonance frequency band.

Here, the wireless power transmitter may control the beacon sequence to start within a predetermined time after entering the power saving state 520. For example, the wireless power transmitter may control the beacon sequence so as to start within 50 ms after transitioning to the power saving state 520, without being limited thereto.

In the power saving state 520, the wireless power transmitter may periodically generate and transmit a first beacon sequence for sensing the wireless power receiver, and may detect a change in the impedance of the reception resonator, i.e., load variation. Hereinafter, for convenience of explanation, the first beacon and the first beacon sequence will be referred to as a short beacon and a short beacon sequence, respectively.

In particular, the short beacon sequence may be repeatedly generated and transmitted at a constant time interval tCYCLE during a short period tSHORT BEACON so that standby power of the wireless power transmitter may be saved until the wireless power receiver is detected. For example, "tSHORT_BEACON" may be set to 30 ms or less, and "tCYCLE" may be set to 250 ms±5 ms. In addition, the current strength of the short beacon may be equal to or greater than a predetermined reference value, and may be gradually increased for a predetermined time period. For example, the minimum current strength of the short beacon may be set to be sufficiently large that a wireless power receiver of category 2 or higher according to the above Table 2 may be detected.

The wireless power transmitter according to the present invention may be provided with a predetermined sensing unit for sensing a change in reactance and resistance in the reception resonator depending on the short beacon.

In addition, in the power saving state 520, the wireless power transmitter may periodically generate and transmit a second beacon sequence for providing sufficient power required for the booting and response of the wireless power receiver. Hereinafter, for convenience of explanation, the second beacon and the second beacon sequence will be referred to as a long beacon and a long beacon sequence, respectively.

That is, the wireless power receiver may broadcast a predetermined response signal through an out-of-band communication channel when booting is completed via the second beacon sequence.

In particular, the long beacon sequence may be generated and transmitted at a constant time interval tLONG_BEACON_PERIOD during a relatively long period tLONG_BEACON compared to the short beacon in order to provide sufficient power required for the booting of the wireless power receiver. For example, "tLONG_BEACON" may be set to 105 ms+5 ms, and "tLONG_BEACON_PERIOD" may be set to 850 ms. The current strength of the long beacon may be stronger than the current strength of the short beacon. In addition, the long beacon may maintain the power of a certain strength during a transmission period.

Thereafter, the wireless power transmitter may stand by the reception of a predetermined response signal during a long beacon transmission period after a change in the impedance of the reception resonator is detected. Hereinafter, for convenience of explanation, the response signal will also be referred to as an advertisement signal. Here, the wireless power receiver may broadcast the advertisement signal through an out-of-band communication frequency band different from the resonant frequency band.

For example, the advertisement signal may include at least one or any one of message identification information for identifying a message defined in the out-of-band communication standard, unique service or wireless power receiver identification information for identifying whether or not the wireless power receiver is legitimate or compatible with the wireless power transmitter, output power information of the wireless power receiver, information about rated voltage/current applied to the load, antenna gain information of the wireless power receiver, information for identifying the category of the wireless power receiver, wireless power receiver authentication information, information about whether or not an overvoltage protection function is installed, or information about the version of software mounted in the wireless power receiver.

The wireless power transmitter may establish an out-of-band communication link with the wireless power receiver after transitioning from the power saving state 520 to the low power state 530 when receiving the advertisement signal. Subsequently, the wireless power transmitter may perform a registration procedure for the wireless power receiver through the established out-of-band communication link. For example, when the out-of-band communication is Bluetooth low power communication, the wireless power transmitter may perform Bluetooth pairing with the wireless power receiver, and may mutually exchange at least one of state information, characteristic information, or control information through the paired Bluetooth link.

When the wireless power transmitter transmits a predetermined control signal for initiating charging via out-of-band communication in the low power state 530 (i.e., a predetermined control signal requesting the wireless power receiver to transfer power to the load) to the wireless power transmitter, the wireless power transmitter may transition from the low power state 530 to the power transfer state 540.

When the out-of-band communication link establishment procedure or the registration procedure is not completed normally in the low power state 530, the wireless power transmitter may transition from the low power state 530 to the power saving state 520.

In the wireless power transmitter, a separate link expiration timer may be driven for connection with each wireless power receiver, and the wireless power receiver needs to transmit a predetermined message indicating the existence thereof to the wireless power transmitter at a predetermined time interval before the link expiration timer expires. The link expiration timer may be reset each time the message is received, and the out-of-band communication link established between the wireless power receiver and the wireless power receiver may be maintained when the link expiration timer does not expire.

When all link expiration timers corresponding to the out-of-band communication link established between the wireless power transmitter and at least one wireless power receiver have expired in the low power state 530 or the power transfer state 540, the wireless power transmitter may transition to the power saving state 520.

In addition, the wireless power transmitter in the low power state 530 may drive a predetermined registration timer when a valid advertisement signal is received from the wireless power receiver. At this time, when the registration timer expires, the wireless power transmitter in the low power state 530 may transition to the power saving state 520. At this time, the wireless power transmitter may output a predetermined notification signal indicating failure of registration through a notification display unit provided in the wireless power transmitter, for example, an LED lamp, a display screen, or a beeper.

In addition, in the power transfer state 540, the wireless power transmitter may transition to the low power state 530 when charging of all connected wireless power receivers is completed.

In particular, the wireless power receiver may allow registration of a new wireless power receiver in a state other than the configuration state 510, the local fault state 550, and the locking fault state 560.

In addition, the wireless power transmitter may dynamically control transmission power based on state information received from the wireless power receiver in the power transfer state 540.

Here, the receiver state information transmitted from the wireless power receiver to the wireless power transmitter may include at least one of required power information, information about the voltage and/or current measured at the rear end of the rectifier, charging state information, information for notifying overcurrent and/or overvoltage and/or overheating, or information indicating whether or not a device that interrupts or reduces power transmitted to the load according to overcurrent or overvoltage is activated. At this time, the receiver state information may be transmitted at a predetermined period, or may be transmitted each time a specific event is generated. In addition, the device that interrupts or reduces the power transmitted to the load according to overcurrent or overvoltage may be provided using at least one of an ON/OFF switch or a Zener diode.

The receiver state information transmitted from the wireless power receiver to the wireless power transmitter according to another embodiment of the present invention may further include at least one of information indicating that a external power supply unit is connected to the wireless power receiver by a wire, or information indicating that the out-of-band communication method is changed (e.g., information indicating that a change from near field communication (NFC) to Bluetooth Low Energy (BLE) communication is possible).

According to still another embodiment of the present invention, the wireless power transmitter may adaptively determine the strength of power to be received for each wireless power receiver based on at least one of current available power thereof, the priority of each wireless power receiver, or the number of connected wireless power receivers. Here, the strength of power for each wireless power receiver may be determined according to the ratio of power to be received to the maximum power that may be processed by the rectifier of the wireless power receiver.

The wireless power transmitter may then transmit a predetermined power control command, including information about the determined power strength, to the wireless power receiver. Here, the wireless power receiver may determine whether or not power control is possible based on the power strength determined by the wireless power transmitter, and may transmit the determination result to the wireless power transmitter through a predetermined power control response message.

The wireless power receiver according to a further embodiment of the present invention may transmit predetermined receiver state information indicating whether or not wireless power control is possible in response to a power control command of the wireless power transmitter before receiving the power control command.

The power transfer state 540 may be any one of a first state 541, a second state 542, and a third state 543 according to the power reception state of the connected wireless power receiver.

For example, the first state 541 may indicate that the power reception state of all wireless power receivers connected to the wireless power transmitter is in a normal voltage state.

The second state 542 may indicate that the power reception state of at least one wireless power receiver connected to the wireless power transmitter is in a low voltage state and there is no wireless power receiver in a high voltage state.

The third state 543 may indicate that the power reception state of at least one wireless power receiver connected to the wireless power transmitter is in a high voltage state.

The wireless power transmitter may transition to the locking fault state 560 when a system error is detected in the power saving state 520, the low power state 530, or the power transfer state 540.

The wireless power transmitter in the locking fault state 560 may transition to either the configuration state 510 or the power saving state 520 when it is determined that all connected wireless power receivers have been removed from the charging area.

In addition, in the locking fault state 560, the wireless power transmitter may transition to the local fault state 550 when a local fault is detected. Here, the wireless power transmitter in the local fault state 550 may transition back to the locking fault state 560 when the local fault is overcome.

On the other hand, when transitioning from any one of the configuration state 510, the power saving state 520, the low power state 530, and the power transfer state 540 to the local fault state 550, the wireless power transmitter may transition to the configuration state 510 when the local fault is overcome.

The wireless power transmitter may interrupt the power supplied to the wireless power transmitter when transitioning to the local fault state 550. For example, the wireless power transmitter may transition to the local fault state 550 when a fault such as overvoltage, overcurrent, or overheating is detected, without being limited thereto.

In one example, the wireless power transmitter may transmit a predetermined power control command to at least one wireless power receiver connected thereto for reducing the strength of power received by the wireless power receiver when overcurrent, overvoltage, overheating, or the like is detected.

In another example, the wireless power transmitter may transmit a predetermined control command to at least one wireless power receiver connected thereto for interrupting charging of the wireless power receiver when overcurrent, overvoltage, overtemperature, or the like is detected.

Through the power control procedure described above, the wireless power transmitter may prevent damage to the device due to overvoltage, overcurrent, overheat, or the like.

The wireless power transmitter may transition to the locking fault state 560 when the strength of current output from the transmission resonator is a reference value or more. At this time, the wireless power transmitter, having transitioned to the locking fault state 560, may attempt to make the strength of the output current of the transmission resonator equal to or less than a reference value for a predesignated time. Here, the attempt may be repeated a predesignated number of times. When the locking fault state 560 is not released despite repeated attempts, the wireless power transmitter may transmit a predetermined notification signal indicating that the locking fault state 560 is not released to the user using a predetermined notification unit. At this time, when all wireless power receivers located in the charging area of the wireless power transmitter are removed from the charging area by the user, the locking fault state 560 may be released.

On the other hand, when the strength of the output current of the transmission resonator falls below the reference value within the predesignated time, or when the strength of the output current of the transmission resonator falls below the reference value while the attempts are repeated the predesignated number of times, the locking fault state 560 may automatically released. At this time, the wireless power transmitter may automatically transition from the locking fault state 560 to the power saving state 520 to perform a detection and identification procedure again for the wireless power receiver.

The wireless power transmitter in the power transfer state 540 may transmit continuous power and adaptively control transmission power based on the state information of the wireless power receiver and predefined optimal voltage region establishment parameters.

For example, the optimal voltage region establishment parameters may include at least one of a parameter for identifying a low voltage region, a parameter for identifying an optimal voltage region, a parameter for identifying a high voltage region, or a parameter for identifying an overvoltage region.

The wireless power transmitter may increase the transmission power when the power reception state of the wireless power receiver is in the low voltage region, and may reduce the transmission power when the power reception state is in the high voltage region.

In addition, the wireless power transmitter may also control the transmission power in order to maximize power transmission efficiency.

In addition, the wireless power transmitter may also control the transmission power so that the deviation of the amount of power required by the wireless power receiver becomes equal to or less than a reference value.

The wireless power transmitter may also stop power transmission when the rectifier output voltage of the wireless power receiver reaches a predetermined overvoltage region, that is, when overvoltage is detected.

Figure 6:
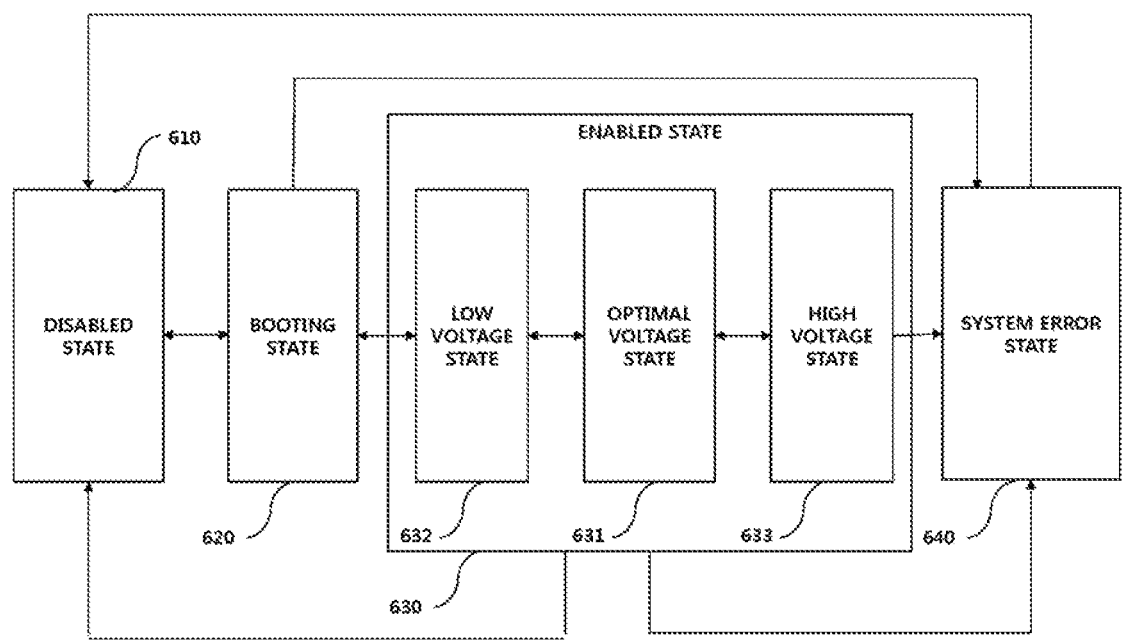
FIG. 6 is a state transition diagram of the wireless power receiver according to an embodiment of the present invention.

FIG. 6 is a state transition diagram of the wireless power receiver according to an embodiment of the present invention.

Referring to FIG. 6, the state of the wireless power receiver may include a disabled state 610, a booting state 620, an enabled state 630 (or an On state), and a system error state 640.

Here, the state of the wireless power receiver may be determined based on the strength of an output voltage at the rectifier end of the wireless power receiver (hereinafter referred to as "VRECT" for convenience of explanation).

The enabled state 630 may be divided into an optimal voltage state 631, a low voltage state 632, and a high voltage state 633 according to the value of VRECT.

The wireless power receiver in the disabled state 610 may transition to the booting state 620 when the measured VRECT value is greater than or equal to a predefined VRECT_BOOT value.

In the booting state 620, the wireless power receiver may establish an out-of-band communication link with the wireless power transmitter, and may stand by until the VRECT value reaches the power required at the load end.

The wireless power receiver in the booting state 620 may transition to the enabled state 630 and start charging when it is confirmed that the VRECT value has reached the power required at the load end.

The wireless power receiver in the enabled state 630 may transition to the booting state 620 when it is confirmed that charging is completed or when charging is interrupted.

In addition, the wireless power receiver in the enabled state 630 may transition to the system error state 640 when a certain system error is detected. Here, system errors may include overvoltage, overcurrent, overheating, and other predefined system error conditions.

In addition, the wireless power receiver in the enabled state 630 may transition to the disabled state 610 when the VRECT value becomes equal to or less than the VRECT_BOOT value.

In addition, the wireless power receiver in the booting state 620 or in the system error state 640 may transition to the disabled state 610 when the VRECT value becomes equal to or less than the VRECT_BOOT value.

Hereinafter, the state transition of the wireless power receiver in the enabled state 630 will be described in detail with reference to FIG. 7, which will be described below.

Figure 7:
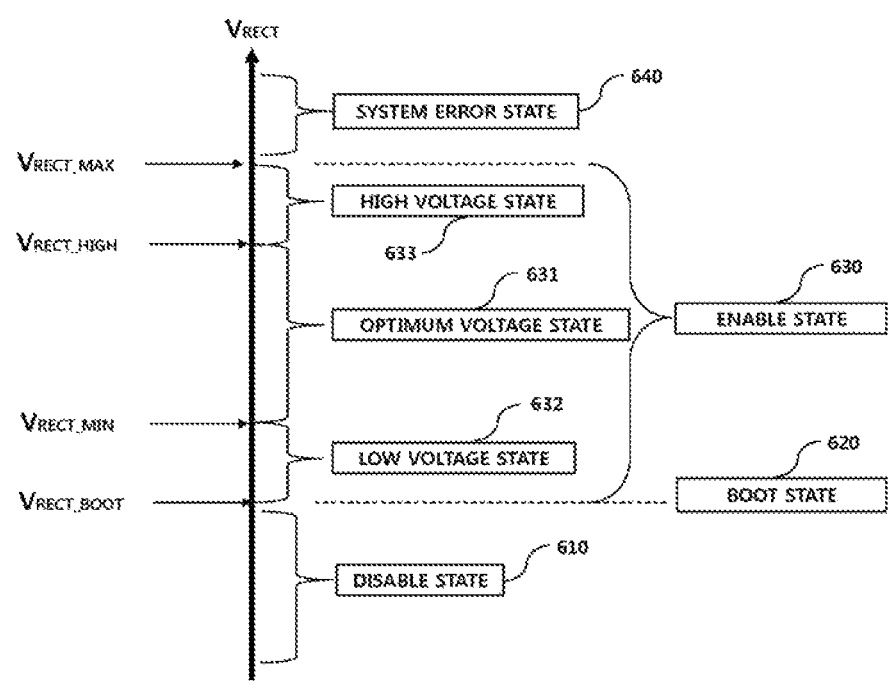
FIG. 7 is a view for explaining an operation region of the wireless power receiver depending on a $V_{RECT}$ according to an embodiment of the present invention.

FIG. 7 is a diagram for explaining an operation region of the wireless power receiver depending on a VRECT according to an embodiment of the present invention.

Referring to FIG. 7, when the VRECT value is less than a predetermined VRECT_BOOT value, the wireless power receiver is held in the disabled state 610.

Thereafter, when the VRECT value is increased to the VRECT_BOOT value or more, the wireless power receiver may transition to the booting state 620 and broadcast an advertisement signal within a predesignated time. Thereafter, when the advertisement signal is detected by the wireless power transmitter, the wireless power transmitter may transmit a predetermined connection request signal for establishing an out-of-band communication link to the wireless power receiver.

When the out-of-band communication link is successfully established and registration succeeds, the wireless power receiver may stand by until the VRECT value reaches the minimum output voltage at the rectifier for normal charging (hereinafter referred to as "VRECT_MIN" for convenience of explanation).

When the VRECT value exceeds the VRECT_MIN, the wireless power receiver may transition from the booting state 620 to the enabled state 630, and the load may begin to be charged.

In the enabled state 630, when the VRECT value exceeds "VRECT_MAX" that is a predetermined reference value for determining overvoltage, the wireless power receiver may transition from the enabled state 630 to the system error state 640.

Referring to FIG. 7, the enabled state 630 may be divided into a low voltage state 632, an optimal voltage state 631, and a high voltage state 633 according to the VRECT value.

The low voltage state 632 may be a VRECT_BOOT≤VRECT≤VRECT_MIN state, the optimal voltage state 631 may be a VRECT_MIN<VRECT≤VRECT_HIGH state, and the high voltage state 633 may be a VRECT_HIGH<VRECT≤VRECT_MAX state.

In particular, the wireless power receiver, having transitioned to the high voltage state 633, may suspend the operation of interrupting the power supplied to the load for a predesignated time (hereinafter referred to as a high voltage state holding time for convenience of explanation). Here, the high voltage state holding time may be predetermined so as to prevent damage to the wireless power receiver and the load in the high voltage state 633.

When the wireless power receiver transitions to the system error state 640, a predetermined message indicating the occurrence of overvoltage may be transmitted to the wireless power transmitter through an out-of-band communication link within a predesignated time.

The wireless power receiver may also control the voltage applied to the load using an overvoltage cutoff device provided to prevent damage to the load due to overvoltage in the system error state 630. Here, an ON/OFF switch and/or a Zener diode may be used as the overvoltage cutoff device.

Although a method and a device for responding to a system error in the wireless power receiver when overvoltage is generated in the wireless power receiver, thereby causing the wireless power receiver to transition to the system error state 640 has been described in the above embodiment, this is only one embodiment, and in another embodiment of the present invention, the wireless power receiver may also transition to the system error state due to overheating, overcurrent, or the like in the wireless power receiver.

For example, when transitioning to the system error state due to overheating, the wireless power receiver may transmit a predetermined message indicating the occurrence of overheating to the wireless power transmitter. Here, the wireless power receiver may reduce the amount of heat that is generated therein by driving a cooling fan or the like.

A wireless power receiver according to another embodiment of the present invention may receive wireless power in cooperation with a plurality of wireless power transmitters. In this case, the wireless power receiver may transition to the system error state 640 when it is determined that a wireless power transmitter that is determined to actually receive wireless power is different from a wireless power transmitter with which an actual out-of-band communication link is established.

Figure 8:
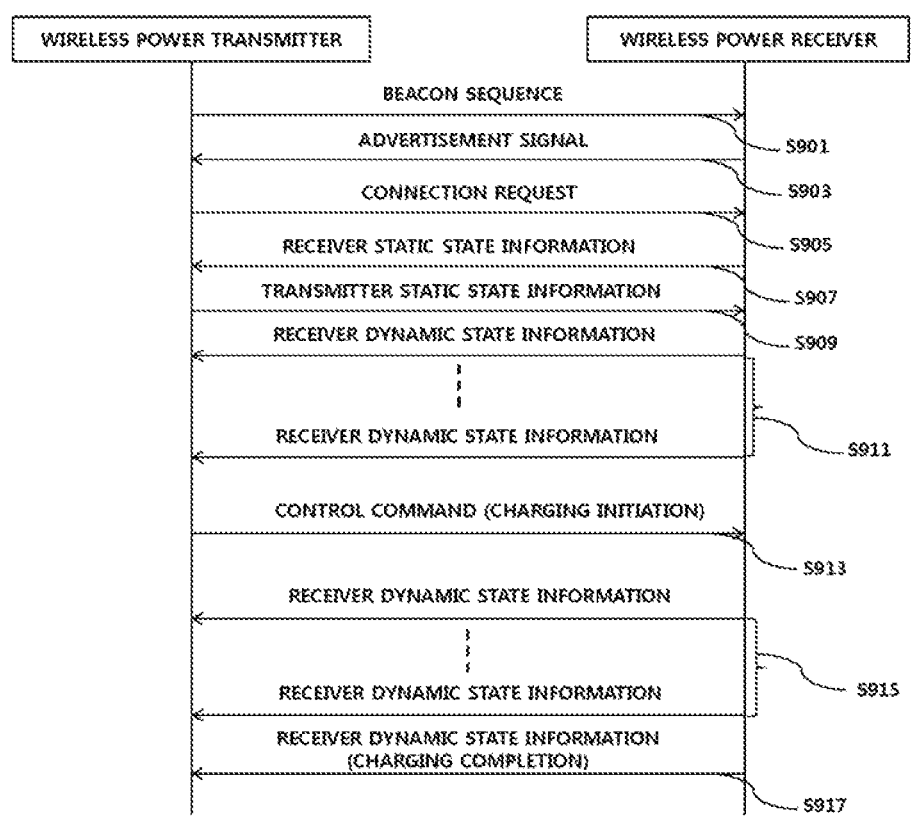
FIG. 8 is a flowchart for explaining a wireless charging procedure according to an embodiment of the present invention.

FIG. 8 is a flowchart for explaining a wireless charging procedure according to an embodiment of the present invention.

Referring to FIG. 8, the wireless power transmitter may generate a beacon sequence and transmit the beacon sequence through the transmission resonator when the wireless power transmitter is completely configured, that is, when booting is completed, according to power application (S901).

When detecting the beacon sequence, the wireless power receiver may broadcast an advertisement signal including identification information and characteristic information thereof (S903). Here, it is to be noted that the advertisement signal may be repeatedly transmitted at a predetermined interval until a connection request signal, which will be described below, is received from the wireless power transmitter.

When receiving the advertisement signal, the wireless power transmitter may transmit a predetermined connection request signal to the wireless power receiver for establishing an out-of-band communication link (S905).

When receiving the connection request signal, the wireless power receiver may establish an out-of-band communication link and transmit static state information thereof through the established out-of-band communication link (S907).

Here, the static state information of the wireless power receiver may include at least one of category information, hardware and software version information, maximum rectifier output power information, initial reference parameter information for power control, information about demand voltage or power, information for identifying whether or not a power adjustment function is installed, information about a supportable out-of-band communication method, information about a supportable power control algorithm, or information about a preferred rectifier terminal voltage value that is initially set in the wireless power receiver.

The wireless power transmitter may transmit the static state information of the wireless power transmitter to the wireless power receiver through the out-of-band communication link when receiving the static state information of the wireless power receiver (S909).

Here, the static state information of the wireless power transmitter may include at least one of transmitter power information, class information, hardware and software version information, information about the maximum number of supportable wireless power receivers, and/or information about the number of currently connected wireless power receivers.

Thereafter, the wireless power receiver may monitor the real-time power reception state and charging state thereof, and may transmit dynamic state information to the wireless power transmitter periodically or when a specific event occurs (S911).

Here, the dynamic state information of the wireless power receiver may include at least one of information about a rectifier output voltage and current, information about the voltage and current applied to the load, information about the measured internal temperature of the wireless power receiver, reference parameter change information (including a minimum rectified voltage value, a maximum rectified voltage value, and an initially set preferred rectifier terminal voltage change value) for power control, charging state information, system error information, or alarm information. The wireless power transmitter may perform power adjustment by changing a set value included in the existing static state information when receiving the reference parameter change information for power control.

In addition, the wireless power transmitter may transmit a predetermined control command through an out-of-band communication link to control the wireless power receiver to initiate charging when sufficient power is available to charge the wireless power receiver (S913).

Thereafter, the wireless power transmitter may receive the dynamic state information from the wireless power receiver and dynamically control transmission power (S915).

In addition, when an internal system error is detected or when charging is completed, the wireless power receiver may transmit, to the wireless power transmitter, data for identifying the system error and/or data indicating that charging is completed, as well as the dynamic state information (S917). Here, system errors may include overcurrent, overvoltage, overheating, and the like.

In addition, a wireless power transmitter according to another embodiment of the present invention may redistribute the power to be transmitted to each wireless power receiver when current available power does not meet the required power of all wireless power receivers connected thereto, and may transmit the power to the corresponding wireless power receivers via a predetermined control command.

In addition, when a new wireless power receiver is registered during wireless charging, the wireless power transmitter may redistribute the power to be received for each connected wireless power receiver based on the current available power, and may transmit the power to the corresponding wireless power receiver via a predetermined control command.

In addition, when the charging of the existing connected wireless power receiver is completed during wireless charging or when the out-of-band communication link is released (e.g., when the wireless power receiver is removed from the charging area), the wireless power transmitter may redistribute the power to be received by each wireless power receiver, and may transmit the power to the corresponding wireless power receiver through a predetermined control command.

In addition, the wireless power transmitter may confirm whether or not the wireless power receiver is equipped with a power control function through a predetermined control procedure. In this case, the wireless power transmitter may perform power redistribution only on the wireless power receiver equipped with the power control function when a power redistribution situation occurs.

For example, the power redistribution situation may occur upon the occurrence of an event, such as the case in which a valid advertisement signal is received from an unconnected wireless power receiver so that a new wireless power receiver is added, the case in which a dynamic parameter indicating, for example, the current state of a connected wireless power receiver is received, the case in which a previously connected wireless power receiver no longer exists, the case in which charging of a previously connected wireless power receiver has been completed, or the case in which an alarm message that indicates the system error state of the previously connected wireless power receiver is received.

Here, the system error state may include an overvoltage state, an overcurrent state, an overheating state, a network connection state, or the like.

For example, the wireless power transmitter may transmit information about power redistribution to the wireless power receiver via a predetermined control command.

Here, the information about power redistribution includes command information for power control of the wireless power receiver, information for identifying whether a power transfer request is permitted or denied, information for generating variation in valid load by the wireless power receiver, and the like.

Here, the command for the power control of the wireless power receiver may include, for example, a first command for performing control so that the wireless power receiver provides received power to the load, a second command for making the wireless power receiver indicate that charging is being performed, and a power adjustment command that indicates the ratio of the maximum power that may be provided by the wireless power transmitter to the maximum rectifier power of the wireless power receiver.

When the wireless power receiver does not support the power control command, the wireless power transmitter may not transmit a power control command to the wireless power receiver.

For example, when a new wireless power receiver is registered, the wireless power transmitter may determine whether or not the wireless power transmitter is capable of providing the power amount required by the wireless power receiver based on the available power amount thereof. When the determination result is that the required amount of power exceeds the amount of available power, the wireless power transmitter may confirm whether or not the power control function is provided in the corresponding wireless power receiver. When the confirmation result is that the power control function is provided, the wireless power receiver may determine the amount of power that the wireless power receiver will receive within the available power amount, and may transmit the determined result to the wireless power receiver through a predetermined control command.

Of course, the power redistribution may be performed within a range in which the wireless power transmitter and the wireless power receiver are normally operable and/or within a range in which normal charging is possible.

In addition, the information for identifying whether the power transfer request is permitted or denied may include a permission condition or a reason for denial.

For example, the permission condition may include permission under the promise of standby for a certain time due to the lack of available power. The reason for denial may include denial due to the lack of available power, denial due to exceeding the number of wireless power receivers that may be accepted, denial due to overheating of the wireless power transmitter, or denial due to the limited class of the wireless power transmitter, for example.

A wireless power receiver according to another embodiment of the present invention may support a plurality of out-of-band communication methods. When it is desired to change the currently established out-of-band communication link to a different one, the wireless power receiver may transmit a predetermined control signal to the wireless power transmitter for requesting a change in out-of-band communication. When the out-of-band communication change request signal is received, the wireless power transmitter may release the currently established out-of-band communication link and establish a new out-of-band communication link using an out-of-band communication method requested by the wireless power receiver.

For example, the out-of-band communication method applicable to the present invention may include at least one of Near Field Communication (NFC), Radio Frequency Identification (RFID) communication, Bluetooth Low Energy (BLE) communication, Wideband Code Division Multiple Access (WCDMA) communication, Long Term Evolution (LTE)/LTE-Advance communication, or Wi-Fi communication.

Figure 9:
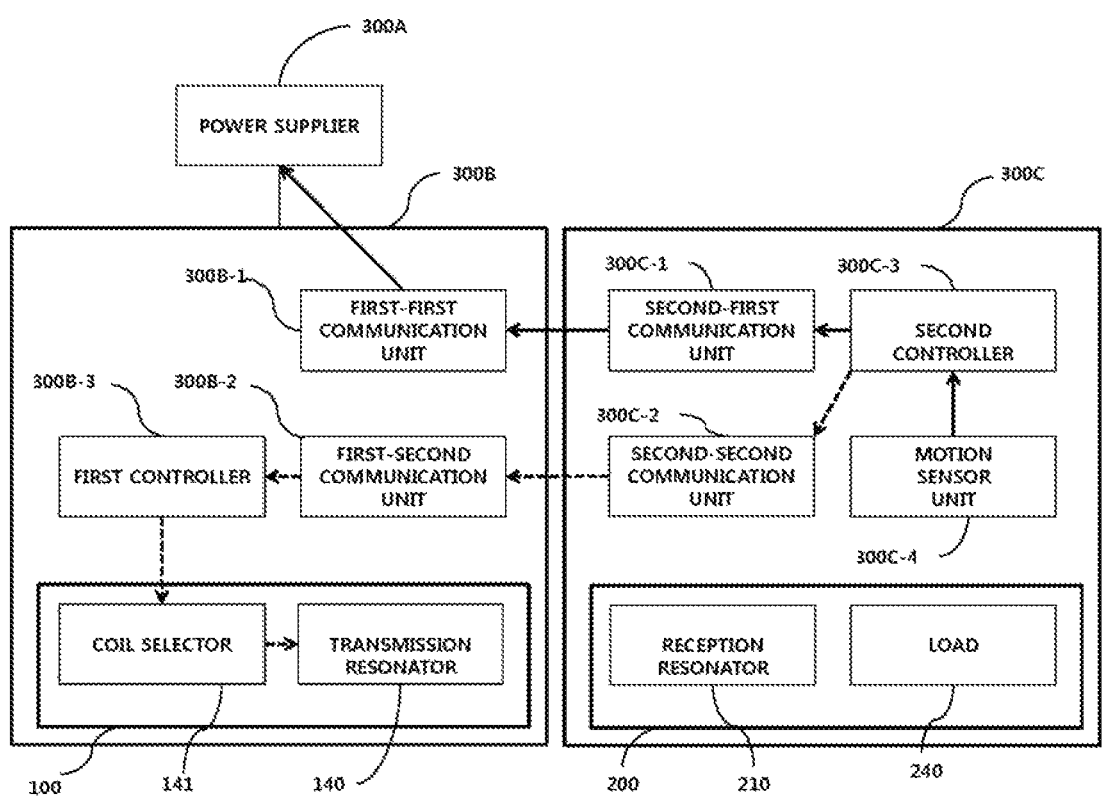
FIG. 9 illustrates a mouse pad and a mouse including a wireless charging device according to an embodiment of the present invention.

FIG. 9 illustrates a mouse pad and a mouse including a wireless charging device according to an embodiment of the present invention.

Referring to FIG. 9, the mouse pad and the mouse (hereinafter, referred to as a mouse system) of the embodiment may include a power supplier 300A, which supplies a voltage, a mouse pad 300B provided to perform, for example, communication with a mouse 300C upon receiving the voltage from the power supplier 300A, and the mouse 300C, which inputs an external command to a personal computer (PC).

The mouse system of the embodiment may be provided as a wired mouse system that is connected to a conventional PC by a wire and inputs a user's command generated from the outside, or may be provided as a wireless mouse system that is wirelessly connected to a PC to transmit a user's command to the PC by a wireless communication method.

The mouse pad 300B may include the wireless power transmitter 100, and the mouse 300C may include the wireless power receiver 200.

The mouse pad 300B may receive power that is to be wirelessly transmitted from the power supplier 300A to the mouse 300C.

The power supplier 300A of the embodiment may be provided only in order to supply a voltage to the mouse pad 300B, or may be provided as a power source that is a part of the PC and supplies a voltage to the outside.

For example, the power supplier 300A of the embodiment may be a USB terminal of the PC.

The position at which the mouse 300C is disposed on the mouse pad 300B may be changed continuously or intermittently according to the movement of a user.

Thus, power may be transmitted in a resonance manner among wireless power transmission standards.

For example, the resonance method may be provided so as to satisfy the A4WP standard.

In order to transmit power in an induction manner, a sufficient amount of power may be transmitted when the positions of the transmission coil of the wireless power transmitter 100 and the reception coil of the wireless power receiver 200 are aligned. However, since the mouse 300C of the embodiment is continuously or intermittently changed in position as described above, a resonance method with a wider charging range may be provided in the interests of power transmission efficiency.

The transmission resonator 140 of the embodiment may include at least two coils.

The reason for this is that, when the entire top surface of the mouse pad 300B is formed using only one coil, there is a high possibility that a null point, which is a portion where power is not transmitted according to the position of the mouse 300C, is generated.

Accordingly, the top surface of the mouse pad 300B may be divided into predetermined sections to arrange a plurality of transmission coils.

The mouse pad 300B may include a coil selector 141, which selects which transmission coil among a plurality of transmission coils is used to transmit power to the reception resonator 210 of the mouse 300C.

For example, when the user moves the position of the mouse 300C so as to locate the mouse at a predetermined position, the coupling coefficient with a first coil, which is one of the plurality of transmission coils, may be lower than the coupling coefficient with a second coil.

In this case, power transmission using the second coil having a higher coupling coefficient may be superior from the aspect of charging efficiency, compared to using the first coil as in the related art.

Therefore, in this case, the coil selector 141 may change the coil for transmitting power from the first coil to the second coil.

In this regard, conventionally, the charging efficiency of the wireless power receiver 200 is continuously monitored, and when the charging efficiency falls below a predetermined level, the transmission coil having the highest coupling coefficient among the plurality of transmission coils is selected.

However, the selection time may be long and the high charging efficiency may not be achieved in the process of selecting the highest coupling coefficient with the wireless power receiver 200 among the plurality of transmission coils.

Therefore, in the mouse system of the embodiment, instead of selecting the transmission coil by the conventional coil selector 141, a configuration in which the position of the wireless power receiver 200 included in the mouse 300C is expected using a motion sensor unit 300C-4 provided in the mouse 300C so as to achieve higher charging efficiency may be provided.

More specifically, the mouse 300C of the embodiment may include the wireless power receiver 200, which wirelessly receives power, the motion sensor unit 300C-4, which senses the amount of variation in position by the motion of the mouse 300C, a second-first communication unit 300C-1, which performs wireless communication in a first scheme, a second-second communication unit 300C-2, which performs wireless communication in a second scheme, and a second controller 300C-3, which controls the mouse 300C.

The second-first communication unit 300C-1 and the second-second communication unit 300C-2 may perform wireless communication with a first-first communication unit 300B-1 and a first-second communication unit 300B-2 in the first scheme and the second scheme, and the first scheme and the second scheme may be different from each other.

For example, the first scheme may be an RF communication scheme and the second scheme may be a BLE scheme.

In addition, the first scheme and the second scheme may have the same communication scheme, and may use different frequency bands.

Hereinafter, a method of selecting a coil of the wireless power transmitter 100 disposed in the mouse pad 300B using positional information of the mouse 300C using the motion sensor unit 300C-4 will be described.

The motion sensor unit 300C-4 may collect positional information of the mouse 300C.

For example, relative vector information of the mouse pad 300B and the mouse 300C may be collected using a ball or an optical sensor disposed on the lower surface of the mouse 300C.

The motion sensor unit 300C-4 may transmit the collected vector information of the mouse 300C to the second controller 300C-3.

The second controller 300C-3 may transmit the vector information of the mouse 300C to the second-first communication unit 300C-1 and the second-second communication unit 300C-2.

The second-first communication unit 300C-1 may transmit the vector information to the first-first communication unit 300B-1 of the mouse pad 300B in the first scheme, and the first-first communication unit 300B-1 may transmit the vector information to the PC including the power supplier 300A.

The vector information of the mouse 300C transmitted to the PC through the second-first communication unit 300C-1, the first-first communication unit 300B-1, and the power supplier 300A may be used to control a mouse cursor to move in response to user input on a monitor connected to the PC.

The second-second communication unit 300C-2 may transmit the vector information to the first-second communication unit 300B-2 in the second scheme, and the first-second communication unit 300B-2 may transmit the vector information to the first controller 300B-3.

The first controller 300B-3 may generate information for determining which transmitter coil to select among a plurality of transmission coils included in the transmission resonator 140 using the vector information of the mouse 300C collected by the motion sensor unit 300C-4.

Various methods of generating the determination information about the selection of the transmission coil using the vector information of the mouse 300C may be provided.

For example, the first controller 300B-3 of the embodiment may expect the position of the mouse 300C by mapping the vector information of the mouse 300C and the entire area of the mouse pad 300B of the embodiment, and may generate the determination information for selecting the transmission coil having the highest coupling coefficient among the plurality of transmission coils according to the expected position of the mouse 300C.

However, this is for convenience of explanation, and the method of generating the determination information about the selection of the transmission coil using the vector information of the mouse 300C may be implemented in various ways according to the needs of the user, and does not limit the scope of the present invention.

The determination information generated by the first controller 300B-3 may be transmitted to the coil selector 141, and the coil selector 141 may transition at least one of the plurality of coils provided in the transmission resonator 140 to an enabled state based on the determination information.

A coil selection algorithm of the embodiment described with reference to FIG. 9 has a disadvantage in that the first controller 300B-3 is overloaded and the coil selection may take a long time because the determination information is generated by the first controller 300B-3, which receives the vector information collected by the mouse 300C directly through the first-second communication unit 300B-2, without passing through the PC including the power supplier 300A.

Therefore, the configuration for reducing the load of data to be processed by the first controller 300B-3 will be described below with reference to FIG. 10.

Figure 10:
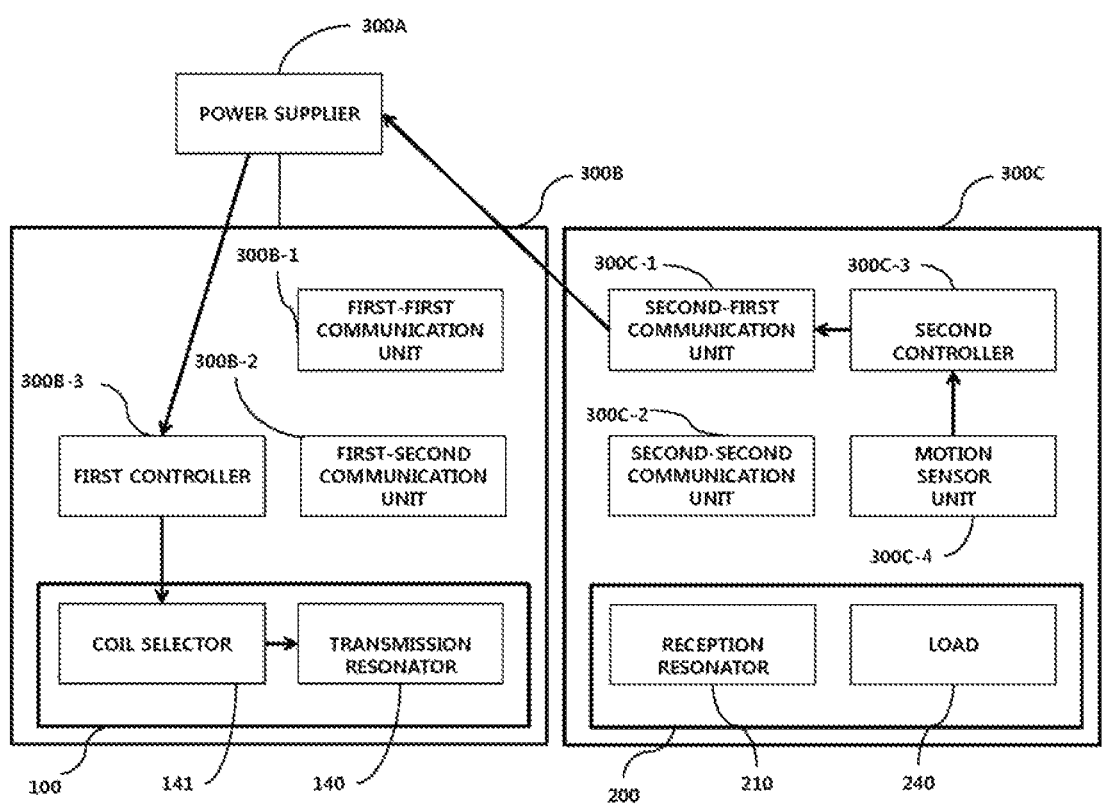
FIG. 10 illustrates a mouse pad and a mouse including a wireless charging device according to another embodiment of the present invention.

FIG. 10 illustrates a mouse pad and a mouse including a wireless charging device according to another embodiment of the present invention.

Referring to FIG. 10, the basic structure is the same as that of the mouse system explained in FIG. 9, and the process of processing the vector information of the mouse 300C collected by the motion sensor unit 300C-4 is different, and only the difference will be described below.

Figure 11:
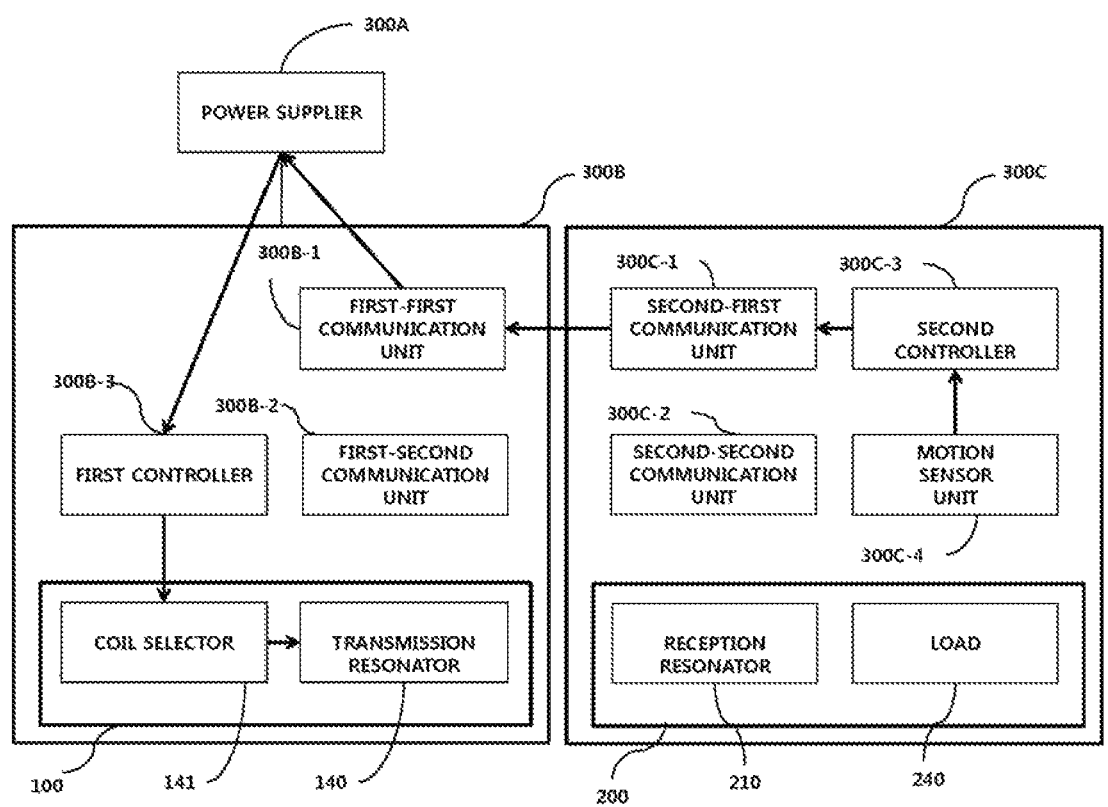
FIG. 11 illustrates a mouse pad and a mouse including a wireless charging device according to a further embodiment of the present invention.

The mouse system of the embodiment may be configured so that the vector information of the mouse 300C is directly transmitted to the PC including the power supplier 300A, unlike the mouse illustrated in FIG. 11.

The vector information of the mouse 300C collected by the motion sensor unit 300C-4 may be transmitted to the second controller 300C-3, and the second controller 300C-3 may transmit the vector information to the second-first communication unit 300C-1.

The second-first communication unit 300C-1, which has received the vector information, may transmit the vector information to the PC including the power supplier 300A using the first scheme.

Unlike the embodiment illustrated in FIG. 9 in which the vector information of the mouse 300C collected by the motion sensor unit 300C-4 is transmitted through the second-first communication unit 300C-1 and the second-second communication unit 300C-2, the vector information of the mouse 300C collected by the motion sensor unit 300C-4 in the present embodiment may be transmitted through only the second-first communication unit 300C-1.

The reason for this is that, because the positional information of the mouse 300C according to use by the user needs to be transmitted to the PC including the power supplier 300A, there is no need to separately process the data by dividing the data into two communication units, which may increase data processing efficiency, and consequently, a processing speed.

The PC including the power supplier 300A, which has received the vector information of the mouse 300C, may generate the determination information about the selection of the transmission coil according to the position of the mouse 300C.

The determination information about the selection of the transmission coil generated by the PC including the power supplier 300A may be transmitted to the first controller 300B-3, and the first controller 300B-3 may transmit the determination information to the coil selector 141.

The coil selector 141 may transition one of the plurality of transmission coils included in the transmission resonator 140 to an enabled state using the determination information.

The method of generating the determination information about the transmission coil selection in the PC including the power supplier 300A may be provided in various ways according to the user.

This is the same as was described above with reference to FIG. 9, and thus a redundant description thereof will be omitted.

The coil selector 141 may transit one of the plurality of transmission coils included in the transmission resonator 140 to an enabled state using the determination information.

FIG. 11 illustrates a mouse pad and a mouse including a wireless charging device according to a further embodiment of the present invention.

Referring to FIG. 11, since the basic configuration is the same as that of the mouse systems described in FIGS. 9 and 10, only differences therebetween will be described below.

The mouse system of the embodiment does not directly transmit the vector information of the mouse 300C to the PC including the power supplier 300A, unlike the mouse illustrated in FIG. 10 described above, and after the vector information is transmitted to the mouse pad 300B, the vector information may be transmitted from the mouse pad 300B to the PC.

Therefore, in the case of the mouse system of the embodiment, the vector information of the mouse 300C collected by the motion sensor unit 300C-4 may be transmitted to the second controller 300C-3, and the second controller 300C-3 may transmit the vector information to the second-first communication unit 300C-1.

The second-first communication unit 300C-1, which has received the vector information, may transmit the vector information of the mouse 300B to the first-first communication unit 300B-1 of the mouse pad 300B in the first scheme.

The first-first communication unit 300B-1 may transmit the collected vector information of the mouse 300C to the PC including the power supplier 300A.

Unlike the embodiment illustrated in FIG. 9 in which the vector information of the mouse 300C collected by the motion sensor unit 300C-4 is transmitted through the second-first communication unit 300C-1 and the second-second communication unit 300C-2, the vector information of the mouse 300C collected by the motion sensor unit 300C-4 in the present embodiment may be transmitted through only the second-first communication unit 300C-1.

The reason for this is that, because the positional information of the mouse 300C according to use by the user needs to be transmitted to the PC including the power supplier 300A, there is no need to separately process the data by dividing the data into two communication units, which may increase data processing efficiency, and consequently, a processing speed.

The PC including the power supplier 300A, which has received the vector information of the mouse 300C, may generate the determination information about the transmission coil selection according to the position of the mouse 300C.

The determination information about the transmission coil selection generated by the PC including the power supplier 300A may be transmitted to the first controller 300B-3, and the first controller 300B-3 may transmit the determination information to the coil selector 141).

The coil selector 141 may transition one of the plurality of transmission coils included in the transmission resonator 140 to an enabled state using the determination information.

The method of generating the determination information about the transmission coil selection in the PC including the power supplier 300A may be provided in various ways according to the user.

It will be apparent to those skilled in the art that the present invention may be embodied in other specific forms without departing from the spirit or essential characteristics thereof. Accordingly, the above detailed description is to be considered in all respects as illustrative and not restrictive. The scope of the present invention should be determined by rational interpretation of the appended claims, and all changes within the scope of equivalents of the present invention are included in the scope of the present invention.

INDUSTRIAL APPLICABILITY

The present invention is applicable to a mouse pad including a wireless power transmission device and a mouse.

The invention claimed is:

1. A mouse pad comprising:
   a wireless power transmission apparatus comprising at least a first transmission coil and a second transmission coil and configured to wirelessly transmit power to a mouse placed on the mouse pad; and
   a controller configured to:
   directly receive determination information from a power supply connected to the mouse pad for selecting one transmission coil among the first transmission coil and the second transmission coil according to a movement of the mouse on the mouse pad, and
   enable the second transmission coil and disable the first transmission coil when the movement of the mouse indicates the mouse is moving on the mouse pad from the first transmission coil to the second transmission coil.

2. The mouse pad according to claim 1, further comprising:
   a first communication unit configured to perform communication with the mouse in a first wireless communication scheme; and
   a second communication unit configured to perform communication with the mouse in a second wireless communication scheme.

3. The mouse pad according to claim 2, wherein the first communication unit is configured to receive motion information corresponding to the movement of the mouse from the mouse and transmit the motion information to the power supply to generate the determination information based on the motion information.

4. The mouse pad according to claim 2, wherein the mouse transmits motion information indicating the movement of the mouse to the mouse pad using only the first wireless communication scheme.

5. The mouse pad according to claim 2, wherein the mouse transmits motion information indicating the movement of the mouse to the first communication unit of the mouse pad and the first communication unit of the mouse pad transmits the motion information to the power supply.

6. The mouse pad according to claim 1, wherein the wireless power transmission apparatus further comprises a coil selector configured to selectively enable and disable the first and second transmission coil.

7. The mouse pad according to claim 1, wherein the controller comprises a communication unit for direct communication with the power supply.

8. The mouse pad according to claim 1, further comprising:
   a first communication unit configured to receive motion information corresponding to the movement of the mouse on the mouse pad from the mouse and transmit the motion information to the power supply to generate the determination information based on the motion information.

9. The mouse pad according to claim 8, wherein the wireless power transmission apparatus further comprises a coil selector configured to selectively enable and disable the first and second transmission coils.

10. The mouse pad according to claim 1, wherein the mouse directly transmits motion information indicating the movement of the mouse to the power supply without directly transmitting the motion information to the mouse pad.

11. The mouse pad according to claim 10, wherein the power supply predicts the movement of the mouse on the mouse pad based on the motion information by mapping vector information of the mouse to an entire area of the mouse pad.

12. The mouse pad according to claim 1, wherein the power supply communicates directly with the controller of the mouse pad, and the controller of the mouse pad controls a coil selector to disable the first transmission coil and enable the second transmission coil.

13. A wireless power transmission system comprising:
a mouse comprising:
a wireless power reception apparatus configured to wirelessly receive power;
a first controller configured to control an operation of the wireless power reception apparatus;
a motion sensor unit configured to obtain motion information generated according to a movement of the first mouse; and
a first communication unit configured to perform communication in one or more schemes; and
a mouse pad comprising:
a wireless power transmission apparatus comprising at least a first transmission coil and a second transmission coil and configured to wirelessly transmit power to the mouse; and
a controller configured to:
directly receive determination information from a power supply connected to the mouse pad for selecting one transmission coil among the first transmission coil and the second transmission coil according to a movement of the mouse on the mouse pad, and
enable the second transmission coil and disable the first transmission coil when the motion information indicates the mouse is moving on the mouse pad from the first transmission coil to the second transmission coil.

14. The wireless power transmission system according to claim 13, wherein the power supply supplies a voltage to the wireless power transmission apparatus of the mouse pad, and
wherein the wireless power transmission apparatus generates the wireless power using the voltage supplied from the power supply.

15. The wireless power transmission system according to claim 13, wherein the wireless power transmission apparatus further comprises a coil selector configured to selectively enable and disable the first and second transmission coils.

16. The wireless power transmission system according to claim 15, wherein the mouse pad further comprises a communication unit configured to receive motion information corresponding to the movement of the mouse from the mouse and transmit the motion information to the power supply to generate the determination information based on the motion information.

* * * * *